United States Patent [19]
Allen, Jr. et al.

[11] Patent Number: 5,535,333
[45] Date of Patent: Jul. 9, 1996

[54] ADAPTER FOR INTERLEAVING SECOND DATA WITH FIRST DATA ALREADY TRANSFERRED BETWEEN FIRST DEVICE AND SECOND DEVICE WITHOUT HAVING TO ARBITRATE FOR OWNERSHIP OF COMMUNICATIONS CHANNEL

[75] Inventors: James J. Allen, Jr.; Ronald J. Cooper; Douglas H. Cox, all of Raleigh; William L. McNeil, Cary; Herbert Rivera-Sanchez, Durham; Terri L. Tomlinson, Louisburg, all of N.C.

[73] Assignee: International Business Machines Corporation, Armonk, N.Y.

[21] Appl. No.: 40,317

[22] Filed: Mar. 30, 1993

[51] Int. Cl.⁶ ................................................. G06F 13/00
[52] U.S. Cl. .................. 395/200.03; 395/484; 395/841; 395/800; 370/85.14; 364/222.2; 364/284.2; 364/284.4; 364/DIG. 1
[58] Field of Search ................................. 395/200, 425, 395/725, 500, 200.03, 841, 484, 800; 370/85.3, 85.6, 94.1, 95.1, 85.14

[56] References Cited

U.S. PATENT DOCUMENTS

| | | | |
|---|---|---|---|
| 4,631,671 | 12/1986 | Kawashita et al. | 395/742 |
| 5,019,966 | 5/1991 | Saito et al. | 395/775 |
| 5,109,501 | 4/1992 | Kaneko et al. | 395/846 |
| 5,142,689 | 8/1992 | Eisenack | 395/800 |
| 5,278,968 | 1/1994 | Koumoto | 395/800 |
| 5,379,381 | 1/1995 | Lamb | 395/826 |

*Primary Examiner*—Thomas C. Lee
*Assistant Examiner*—Moustafa Mohamed Meky
*Attorney, Agent, or Firm*—Stephen T. Keohane; Daniel N. Yannuzzi

[57] ABSTRACT

A system and method for controlling a communications adapter interface such that supplemental data can be interleaved with data being transferred. The interleaving is performed in a manner such that the supplemental data is transparent to the data mover portion of the communications adapter. The supplemental data can be transferred in either read or write cycles that are interleaved at the beginning, in the middle, or at the end of data bursts or block data transfers. As a result of the interleaving, the slave interface bus is more fully utilized because arbitration and bus ownership changes do not create unused cycles. The interleaving is accomplished by temporarily halting an existing transfer of data and transferring the requested supplemental data while the data transfer is halted. After the supplemental data is transferred, the transfer of the balance of the data block is then allowed to continue. In other words, the present invention "steals" a cycle from the data transferror and uses this cycle to transfer supplemental data.

18 Claims, 10 Drawing Sheets

ADAPTER FOR INTERLEAVING SECOND DATA WITH FIRST DATA ALREADY TRANSFERRED BETWEEN FIRST DEVICE AND SECOND DEVICE WITHOUT HAVING TO ARBITRATE FOR OWNERSHIP OF COMMUNICATIONS CHANNEL

TECHNICAL FIELD

This invention relates to communications adapters, and more specifically to a system and method for interleaving control, status, diagnostic information and/or other data with data being transferred by a communications adapter.

BACKGROUND ART

With the advent of low-cost computing capacity, computers and processor-based systems have found their way into numerous environments and applications. Computers and processor-based systems can be found in contemporary offices, plants, homes and other facilities. As the popularity of computer systems increases and new utility is found for their application, market forces tend to result in an increase in computing power at a given cost point. This is a result of new innovations to meet market demands for more processing power, and economies of scale associated with high-volume production.

To meet market demands for faster computing, system designers have enhanced almost every aspect of processor-based systems. One area of enhancement is in processor communications. For example, the IBM 3746 Expansion Unit Model 900 High-Performance Parallel Bus (HPPB) structure was developed to provide high speed communications among processor devices. The IBM 3746 Expansion Unit Model 900 is available from International Business Machines corporation in La Gaude, France. The HPPB bus allows high-speed parallel transfer of data among CPUs (central processing units), memories, disk drives, external interfaces and other I/O, and the like.

An additional development associated with the widespread use of processor-based systems was the evolution of communications techniques whereby distinct processors in multiple locations can communicate with one another. One such technique involves the use of Local Area Networks (LANs) to allow processors to share data with each other. To accomplish this sharing of data, computers send data to one another across the LAN. The data is packaged for transmission into packets. Interfacing a processor to the LAN is accomplished using a device called a LAN controller.

Typical LAN controllers can be characterized as having a transfer rate that is quite slow as compared to the HPPB bus. This can generally be attributed to the large amount of overhead associated with typical LAN controllers. Because of this rate differential, interfacing an HPPB bus-based system to a LAN can have an adverse impact on the performance of the HPPB system. When a LAN controller transfers data to or from the HPPB bus, its inefficiencies result in a communications exchange that "ties up" the HPPB bus for a period of time that is longer than desired. This prohibits the HPPB bus from allowing other data transfers during this time. Because the HPPB bus is capable of executing the transfers in a shorter period of time, the LAN controller is a limiting factor to HPPB performance.

To overcome this rate differential problem, system designers have developed and implemented a communications adapter. The communications adapter is essentially a rate buffer. Data transferred from the HPPB bus at a higher rate is buffered in the communications adapter and then transferred to the LAN controller at the controller's lower data rate. Similarly, data transferred from the LAN controller is accepted and buffered at the LAN controller's lower data rate. When all the data (or a large block thereof) is buffered, the communications adapter transfers it onto the HPPB bus at the higher rate. Thus the HPPB bus is not limited to operating at the LAN controller's lower data rate.

Communications adapters are not restricted for use in interfacing a high speed bus to a lower speed LAN as discussed above. Communications adapters can be used to interface any bus or network operating at a given speed to any device operating at a different interface data rate. In this patent document, the communications adapter is described as providing an interface to the device via a "communications channel."

One limitation with the conventional communications adapter is that it does not allow for efficient transfer of control, status, diagnostic information and/or other data along with data transfers. When a processor wants to exchange this control, status, diagnostic information, and/or other data across the communications adapter it has to request and be granted access to the bus to allow the transfer to occur. This requires arbitration for and a change in bus ownership and usually results in wasted bus cycles.

In this document, the term "supplemental data" is used to generally describe control, status, diagnostic information, and/or other data to be interleaved with a current data transfer.

Additionally, the term "unit" used in conjunction with data defines a unit of data to be transferred. A unit of data can refer to a half word, a full word, a byte, or any other grouping of bits or bytes.

What is needed, then, is a system and method for interfacing a conventional slave controller to a high speed master bus, where the system allows interleaving of supplemental data transfer cycles with data burst cycles. The ideal solution will be such that the interface bus is fully utilized and errors during burst data cycles do not interfere with the operation of the supplemental data path.

DISCLOSURE OF THE INVENTION

A system and method for interleaving additional data with data already being transferred is disclosed. This transparent cycle steal and interleaving mechanism was developed for use with a communications adapter that transfers data between a first device and a second device. Where the devices operate at different speeds, or data rates, the communications adapter may provide rate-buffering functions to equalize the data transfer rates. A master/slave relationship may exist between the first and second devices.

In an example communications adapter, a data mover performs the actual data transfer. The data mover is typically based on a finite state machine. Where rate buffering is involved, the data is stored in data buffers in the communications adapter. As an example, consider a write operation in which the first device writes to the second device. In this example, the communications adapter receives data from the first device and stores this data in data buffers. When the transfer is to take place, the data mover receives data from the data buffers and transfers this data over a communications channel to the second device. For a read operation from the second device to the first, the data mover receives data from the second device and this data is stored in the data buffers for subsequent transfer to the first device. The communications channel is typically a bus.

The data mover transfers one unit of data for each bus cycle. The data mover uses addresses and data counters to manage the data transfer. As each unit of data is transferred across the bus, the addresses and counters are incremented so that during each cycle, the correct data is transferred.

When there are one or more units of supplemental data to be transferred, the transparent cycle steal and interleaving mechanism first determines if the data mover is currently transferring data (original data). If so, the present cycle (cycle N) is allowed to complete and the unit of data designated for transfer during that cycle is transferred by the data mover. During the next cycle (cycle N+1), the transparent interleaving mechanism controls the data mover to transfer supplemental data as opposed to the original data. For a write operation, the transparent interleaving mechanism controls the data mover such that the data mover transfers supplemental data as opposed to original data from the data buffers.

During cycle N+1, the data mover is not connected to the bus and therefore, the unit of data designated for transfer during this cycle is not actually transferred. Also during cycle N+1, the addresses and counters of the data mover are inhibited from incrementing.

During the following cycle (N+2), the data mover resumes its transfer of the original data. Because the counters and addresses were inhibited during cycle N+1, the original data that was to be transferred at that time is transferred during cycle N+2. Thus, no data is lost and the data mover is unaware that a cycle was stolen.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit of a reference number identifies the drawing in which the reference number first appears.

BEST MODE FOR CARRYING OUT THE INVENTION

1. Overview of the Invention

The present invention provides a system and method for controlling a communications adapter interface such that supplemental data can be interleaved with data being transferred. The interleaving is performed in a manner such that the supplemental data is transparent to the data mover portion of the communications adapter. The supplemental data can be transferred in either read or write cycles that are interleaved at the beginning, in the middle, or at the end of data bursts or block data transfers. As a result of the interleaving, the interface bus is more fully utilized because arbitration and bus ownership changes do not create unused cycles.

The interleaving is accomplished by temporarily halting an existing transfer of data and transferring the requested supplemental data while the original data transfer is halted. After the supplemental data is transferred, the transfer of the balance of the block of data originally being transferred is then allowed to continue. In other words, the present invention "steals" a cycle from the data transferror and uses this cycle to transfer supplemental data.

In a preferred embodiment, a finite state machine controls the routine transfer of data between the master and the slave device. The finite state machine is controlled to select which data is actually transferred and to which location. The data source, data direction, data addresses and read/write tags, of the finite state machine are changed thereby selecting whether data or supplemental data is transferred.

The following example illustrates the general operation of the invention. A finite state machine is currently transferring data across a slave bus. If the finite state machine is transferring 21 bytes of data and it is desired to transfer a byte of supplemental data, the data address and data counters are inhibited from incrementing, and the addresses for the status byte are inserted so that the finite state machine actually transfers the status byte. Then, the address and counters are un-inhibited and the finite state machine transfers the balance of the 21 bytes of data. When the transfer is completed, the finite state machine will actually have sent 22 bytes of data.

2. Example Environment

Figure 1:
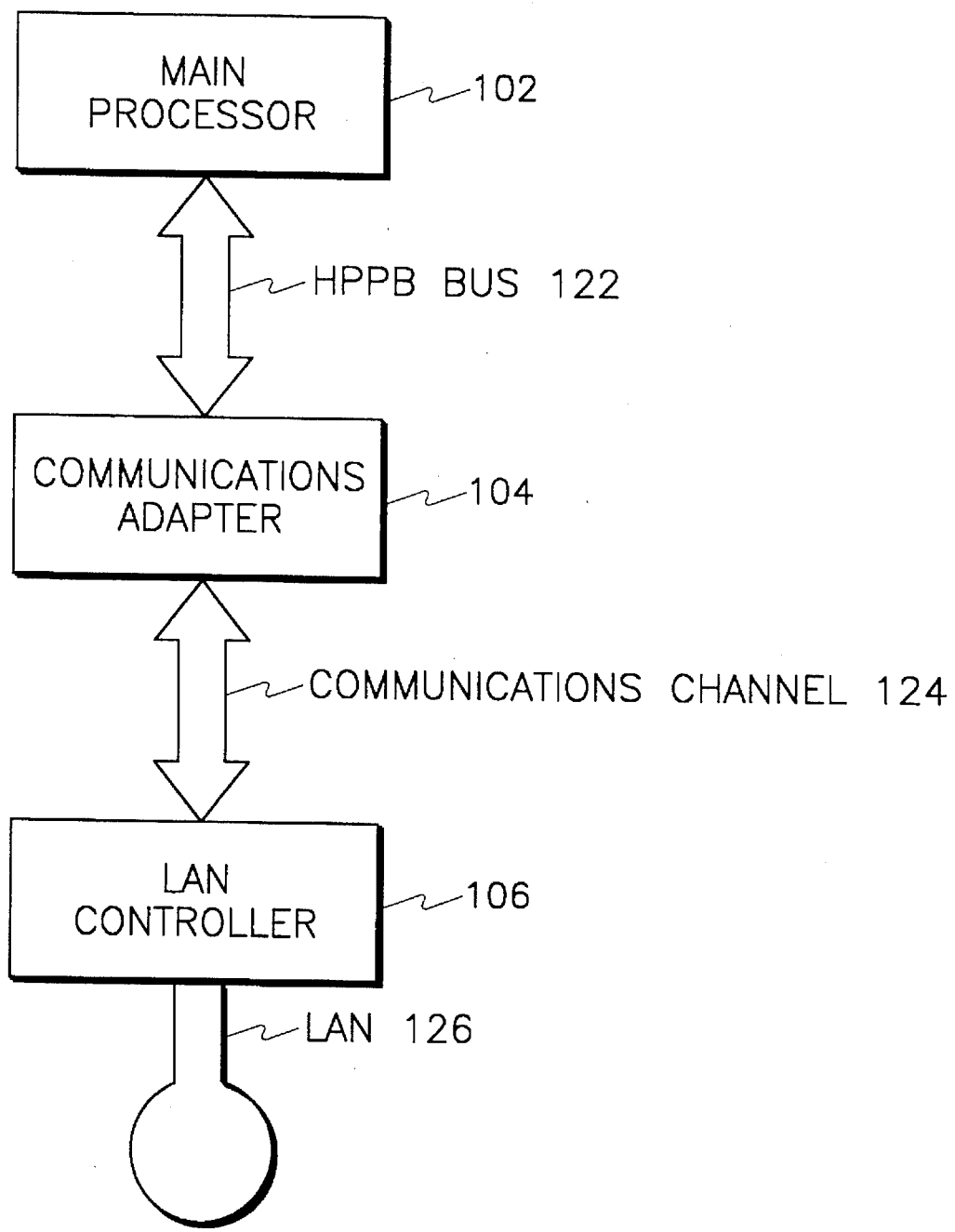
FIG. 1 is a block diagram illustrating an example environment in which the present invention may exist.

The present invention can be implemented to benefit numerous architectures. One architecture that may benefit is a communications adapter wherein a relatively low speed slave device such as a token ring LAN is interfaced to a higher speed bus such as the HPPB bus. FIG. 1 illustrates just one example of such an environment in which the transparent interleaving according to the present invention can be implemented. Referring to FIG. 1, a main processor 102 controls the operation of an HPPB bus 122. Other processors, and interface modules, although not shown, may also be connected to HPPB bus 122.

A communications adapter 104 is provided to interface devices on HPPB bus 122 to a LAN controller 106. A communications channel 124 interfaces communications adapter 104 to LAN controller 106. In a preferred embodiment, communications channel 124 is a bus.

LAN controller 106 controls the interface to a LAN 126. LAN 126 typically operates at a lower speed than HPPB bus 122. An example of a LAN 126 is a token ring.

The transparent interleaving according to the present invention is incorporated into communications adapter 104. Communications adapter 104 is described in more detail with respect to FIG. 2. An example of a communications adapter 104 is the Foxburg Module and an example of LAN controller 106 is the Pinegrove Module. Both modules are available from International Business Machines (IBM) in Raleigh, N.C.

3. Description of the Embodiments

Figure 2:
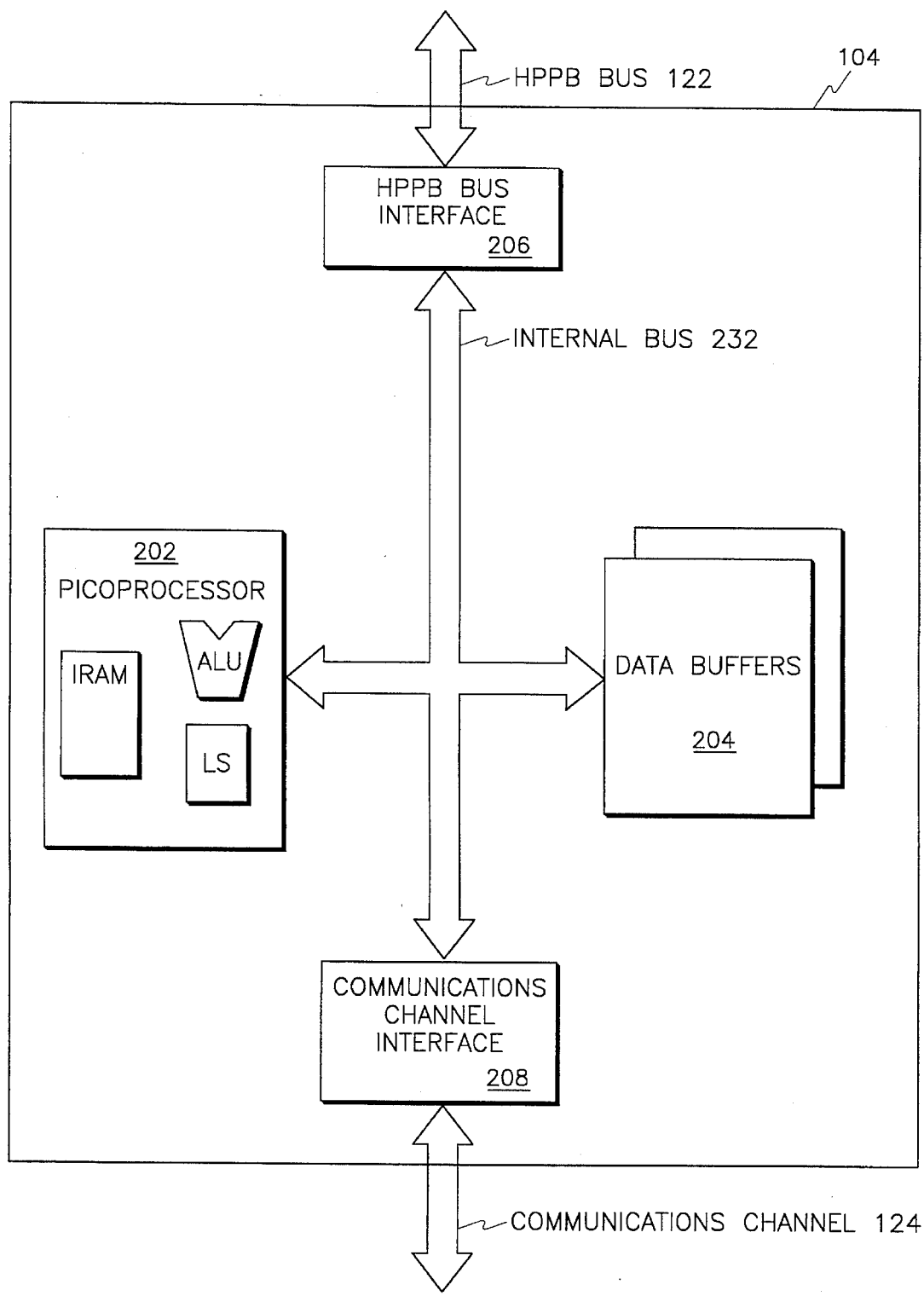
FIG. 2 is a block diagram illustrating a typical communications adapter that benefits from the present invention.

A functional block diagram of a communications adapter 104 is illustrated in FIG. 2. In a preferred embodiment, a picoprocessor 202 controls the operation of communications adapter 104. Picoprocessor 202 sets up all pointers and addresses necessary to transfer data between LAN controller 106 and main processor 102. Thus, instead of main processor 102 executing the details of a data transfer, picoprocessor 202 carries out these responsibilities.

Alternative embodiments may be contemplated wherein other means are provided for controlling the operation of communications adapter 104. These means could include devices such as microprocessors, state machines, discrete logic and the like. It would be apparent to one skilled in the relevant art how these and other devices could be used to control the operation of communications adapter 104.

Data buffers 204 are used by picoprocessor 202 as a temporary store for the data to be transferred. An HPPB bus interface 206 provides an interface to HPPB bus 122. Similarly, a communications channel interface 208 provides an interface to communications channel 124. Data is transferred among picoprocessor 202, data buffers 204, HPPB bus interface 206, and communications channel interface 208 using an internal bus 232.

A scenario regarding how data is transferred using communications adapter 104 will first be described without discussion of the transparent interleaving. The scenario involves the process by which communications adapter 104 facilitates the operation of main processor 102 writing data to LAN controller 106. Based on this scenario, a similar scenario in which main processor 102 reads data from LAN controller 106 would be apparent to a person skilled in the relevant art.

Figure 3:
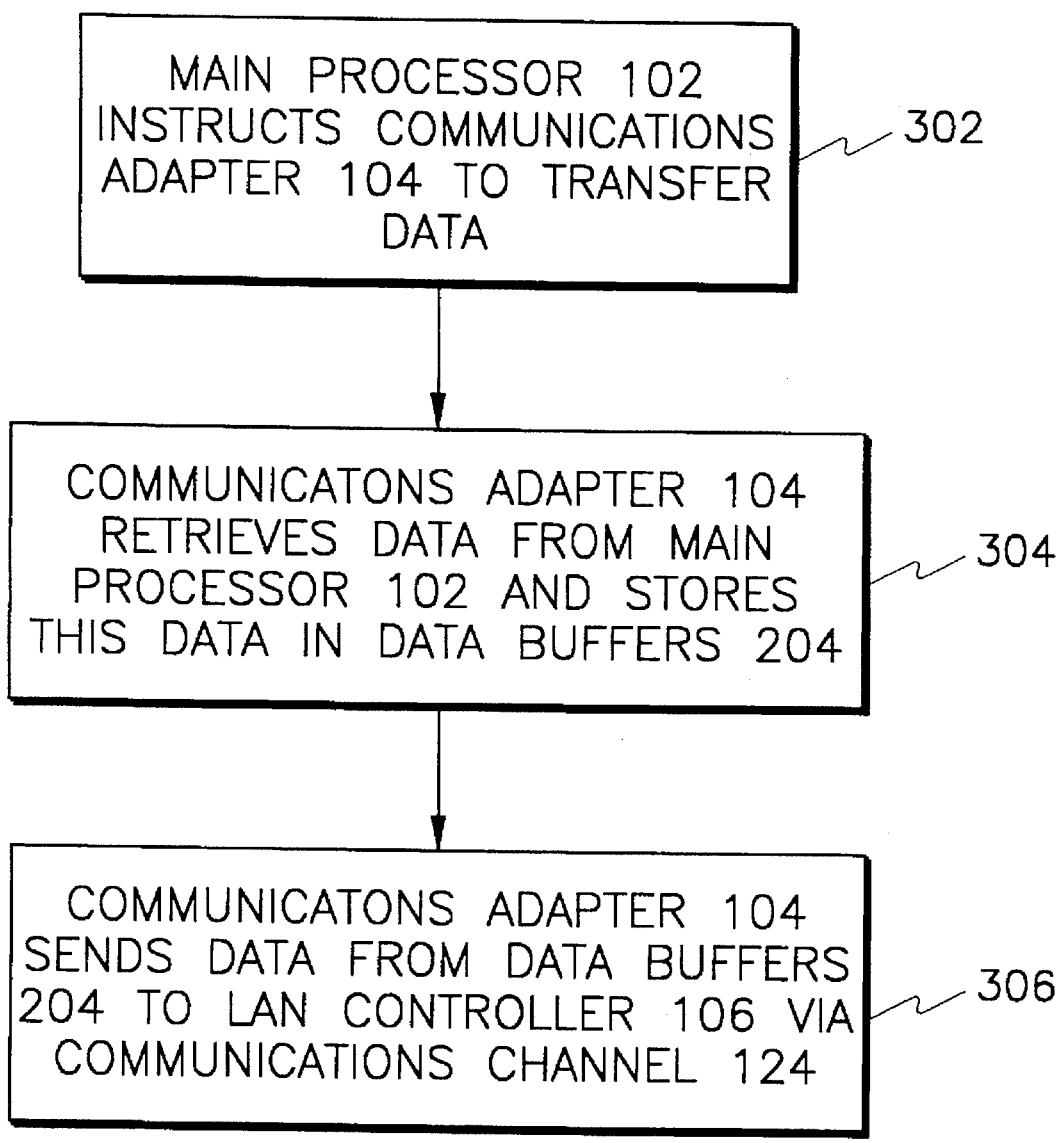
FIG. 3 is a flow chart illustrating a transfer of data between a master processor and a slave device.

FIG. 3 is a flow diagram illustrating steps involved in this scenario. Referring now to FIGS. 1, 2, and 3, in a step 302, main processor 102 instructs picoprocessor 202 to send a frame of data. As would be apparent to a person skilled in the relevant art, other units may be used to describe the amount of data to be sent. Picoprocessor 202 receives this instruction and begins executing.

In a step 304, picoprocessor 202 pulls the frame of data (or a subset thereof) from main processor 102 and stores it in data buffers 204. Picoprocessor 202 may manipulate the frame while it is in data buffers 204. Because communications adapter 104 operates at high speeds, the transfer of data over HPPB bus 122 to data buffers 204 occurs rapidly and does not consume an undue amount of HPPB bus time.

In a step 306, picoprocessor 202 retrieves the data from data buffers 204 and sends it to LAN controller 106 via communications channel 124. Because LAN controller 106 operates at a slower rate than HPPB bus 122, this transfer is at a slower rate than that of the transfer in step 304. However, because this transfer involves only the communications channel 124 (and not HPPB bus 122) the performance of HPPB bus 122 is not impacted by the relatively slow speed of this operation.

In other words, the operation in step 306 is asynchronous with respect to main processor 102 and HPPB bus 122. As a result, main processor 102 and HPPB bus 122 can perform other operations while the transfer of step 306 is taking place.

Picoprocessor 202 performs the transfer of step 306 by incrementing counters and an address to transfer data from data buffers 204 to the correct destination. The operation of picoprocessor 202 in performing a routine data transfer between buffers and an I/O port is well known to persons skilled in the relevant art.

Figure 4:
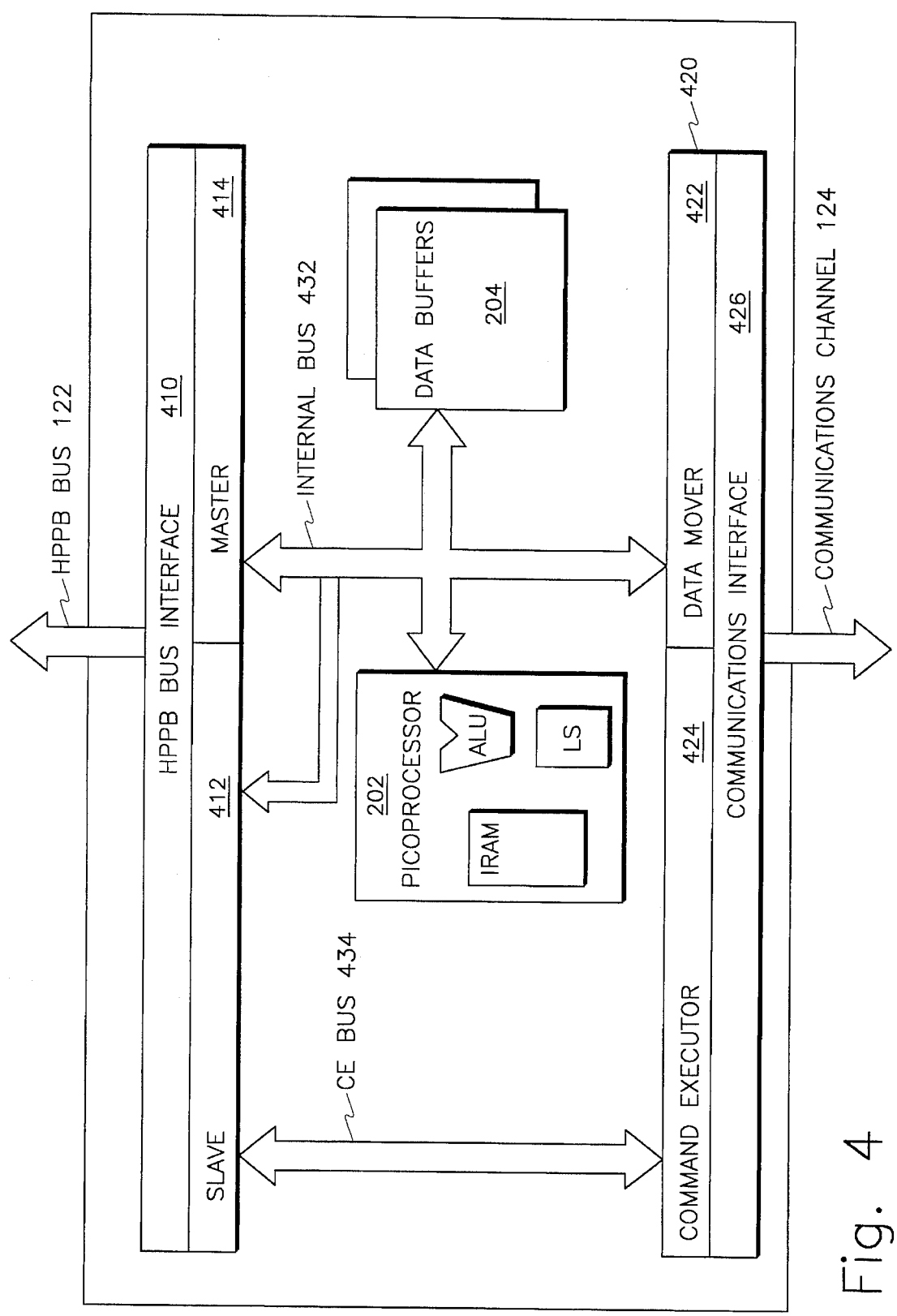
FIG. 4 is a functional block diagram illustrating the transparent cycle steal mechanism according to the present invention implemented in a communications adapter.

The transparent cycle steal and interleaving capabilities provided by the present invention allow main processor 102 to request that communications adapter 104 also interleave a transfer of supplemental data contemporaneous with an ongoing data transfer like the one described above. FIG. 4. is a functional block diagram illustrating a communications adapter 104 configured to allow such a transparent, interleaved transfer.

Referring to FIGS. 1 and 4, a communications interface controller 420 controls the transfer of data and supplemental data between LAN controller 106 and communications adapter 104. Communications interface controller 420 comprises a data mover 422, a command executor 424 and a communications interface 426. In a preferred embodiment, data mover 422 is a finite state machine that performs the actual transfer of data. Command executor 424 handles supplemental data and "steals" cycles away from data mover 422 for transferring this supplemental data. The method by which this is accomplished is fully described below. ACE bus 434 is provided to transfer the supplemental data between an HPPB bus interface 410 and command executor 424.

HPPB bus interface 410 can function as a master interface 414 or a slave interface 412 as illustrated in FIG. 4. When transfers are originated by main processor 102, communications adapter 104 is functioning as a slave and HPPB bus interface 410 is a slave interface 412. When transfers are originated by communications adapter 104 (or LAN controller 106) communications adapter 104 functions as the master and HPPB bus interface 410 is a master interface 414.

Figure 5:
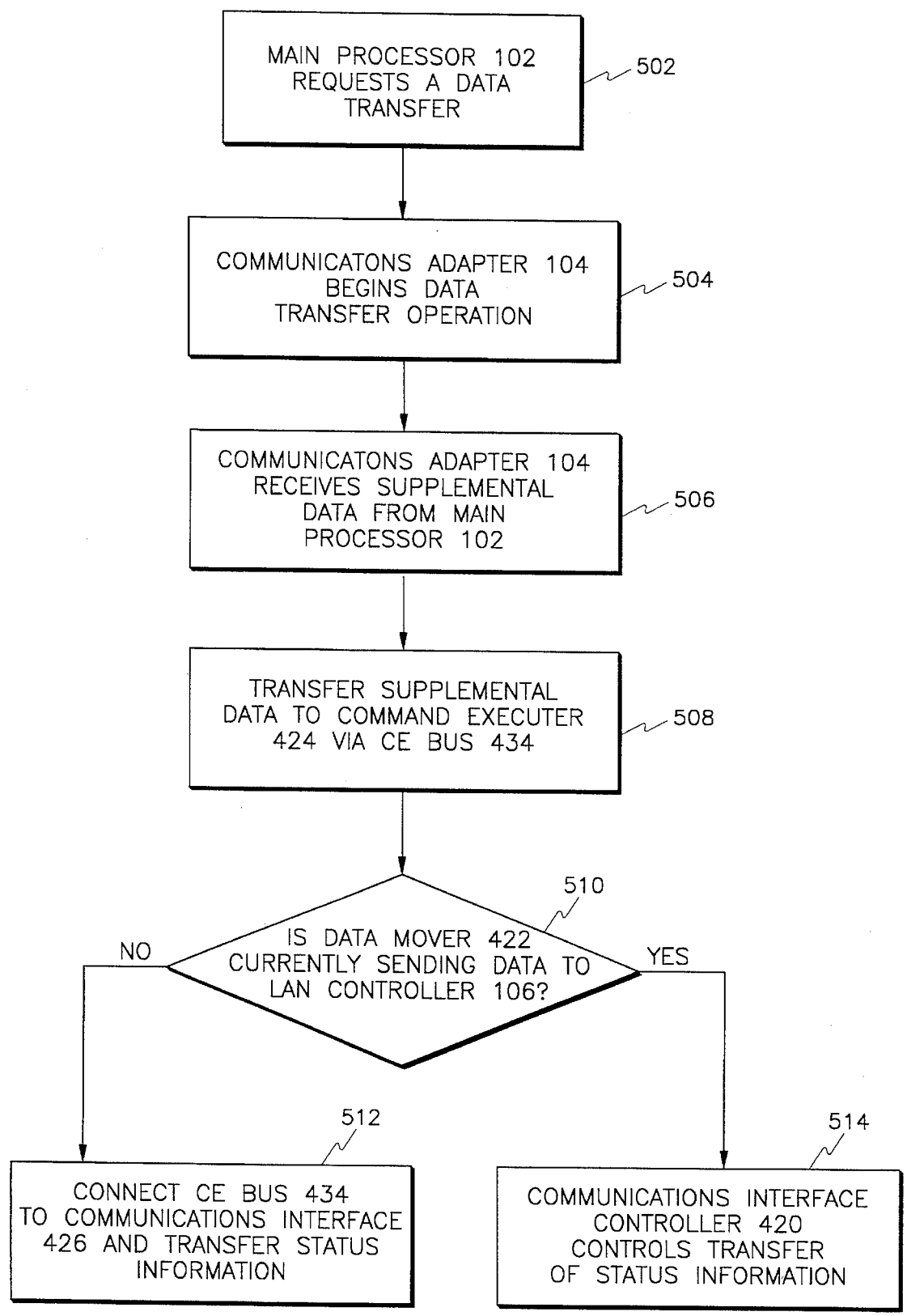
FIG. 5 is a flow diagram illustrating the process of transferring supplemental data between a master processor and a slave device.

The method by which the transparent interleaving is accomplished will now be described. FIG. 5 is a flow diagram illustrating the steps involved in an interleaved transfer. Referring now to FIGS. 1, 4 and 5, in a step 502, main processor 102 requests that a data transfer take place between itself and LAN controller 106. This data transfer is similar to the transfer described above with reference to FIG. 3. This transfer request is received by communications adapter 104.

In a step 504, communications adapter 104 begins executing the data transfer requested in step 502. For a write operation, picoprocessor 202 retrieves data at high speed from main processor 102 via HPPB bus interface 410 and stores this data in data buffers 204. This data is then clocked out of data buffers and sent to LAN controller 106 over communications channel 124 via communications interface 426. For a read operation, picoprocessor retrieves data at slower speeds (relative to HPPB bus 122) from LAN controller 106 via communications interface 426 and stores this data in data buffers 204. This data is then sent to main processor 102 at high speed over the HPPB bus 122 via HPPB bus interface 410. Note, the read operation may be performed at the request of LAN controller 106 as opposed to main processor 102.

The actual transfer is accomplished by data mover 422. Data mover 422 is a finite state machine that transfers one unit of data during each cycle. In a preferred embodiment the unit of data transferred is two bytes, or one half word. Data mover 422 uses addresses and counters to keep track of the data to be transferred at each cycle. At the end of each cycle the address and counters are incremented so that the next sequential unit of data is transferred. This continues until the balance of original block of data is transferred. The operation of data mover 422 in such a transfer is described in greater detail below with respect to the timing diagram in FIG. 8.

An internal bus 432 is used to provide connectivity between HPPB bus interface 410, data buffers 204 and data mover 422. Data, address information, and supplemental data are transferred between HPPB bus interface 410, data buffers 204 and data mover 422.

Although the preferred embodiment uses picoprocessor 202 and data buffers 204 to perform the rate-buffered data transfers, alternative embodiments may be contemplated wherein other mechanisms are employed for achieving these data transfers.

While the data transfer of step 504 is taking place, main processor 102 may determine that it needs to send supplemental data to LAN controller 106. In this case, main processor 102 sends this supplemental data to communications adapter 104 via HPPB bus 122. In a step 506, communications adapter 104 receives this supplemental data. More specifically slave HPPB bus interface 412 receives the information.

Slave HPPB bus interface 412 puts this supplemental data onto CE bus 434 whereby it is transferred to command executor 424 in a step 508. Operations over CE bus 434 are asynchronous operations initiated by slave HPPB bus interface 412. These operations originate as either read or write operations to LAN controller 106 address space.

In a step 510, command executor 424 receives the supplemental data and checks to see if data mover 422 is currently transferring data to LAN controller 106 (e.g., in step 504). If data mover 422 is not transferring data, CE bus 434 is connected to communications interface 426 and the transfer of supplemental data is executed in a step 512. If data mover 422 is currently transferring data over communications channel 124, the supplemental data transfer is controlled by communications interface controller 420 in a step 514.

Figure 6:
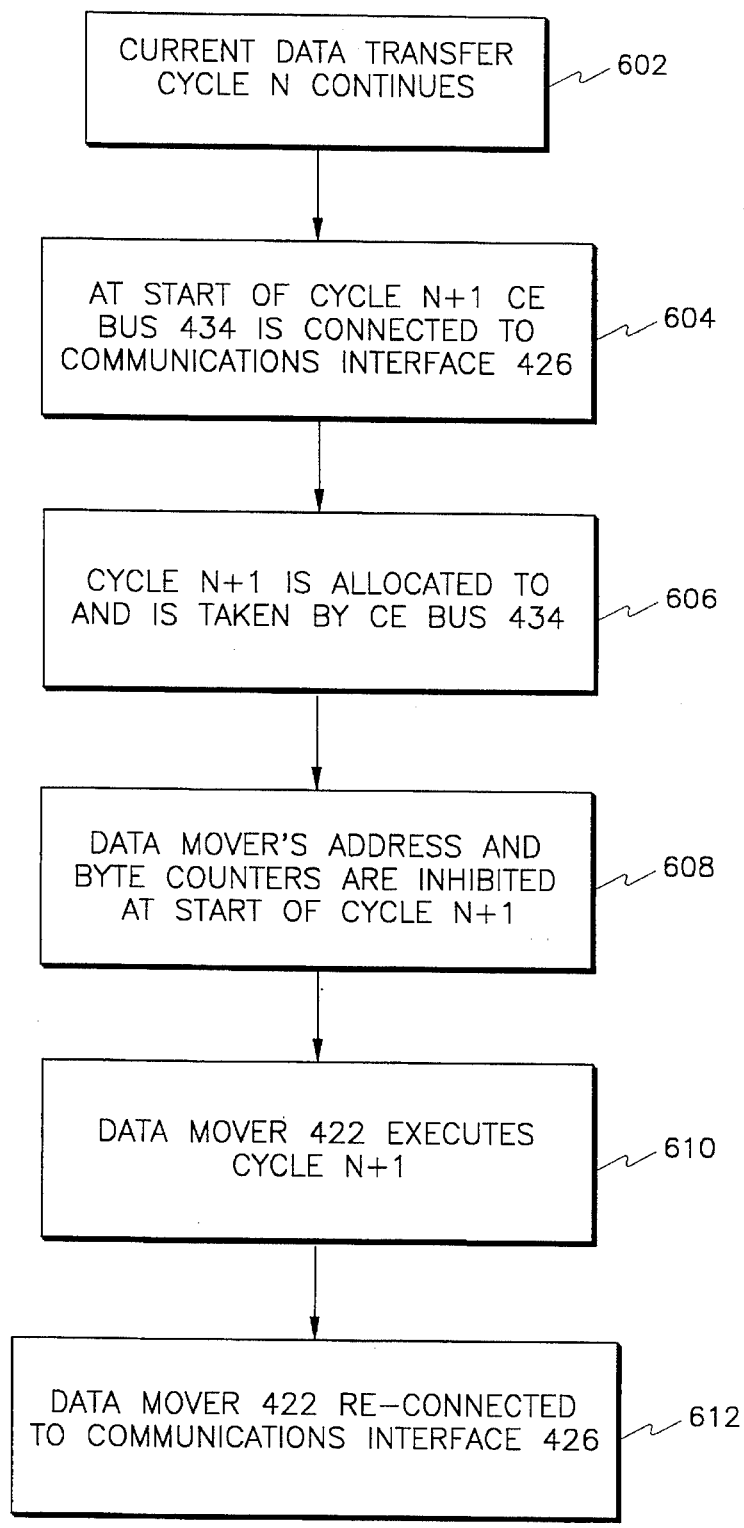
FIG. 6 is a flow diagram illustrating a process used by a communications interface controller to interleave supplemental data with data already being transferred.

The details of step 514 are described in the flow chart of FIG. 6. Referring now to FIGS. 1, 4 and 6, in a step 602 the current data transfer cycle (e.g., step 504) proceeds in a normal manner. In a step 604, at the start of the next cycle (referred to as cycle N+1), CE bus 434 is connected to communications interface 426 and data mover 422 is disconnected. In a step 606, cycle N+1 is allocated to and taken by CE bus 434 (i.e., the cycle is stolen from data mover 422 by command executor 424). At this time, during cycle N+1, supplemental data is transferred to LAN controller 106 via communications interface 426 and communications channel 124.

In a step 608, data mover's address counters and byte counters associated with the original data transfer (of step 504) are inhibited for one cycle. Data mover 422 executes cycle N+1 in a step 610. Because the counters are inhibited, they do not advance at the end of the cycle. Also, because data mover 422 is not connected to communications interface 426, the transfer of data that was originally supposed to take place during cycle N+1 does not occur.

In a step 612, data mover 422 is reconnected to communications interface 426 and the data transfer operation resumes. Because the counters did not advance at the end of cycle N+1, the operation resumes with the transfer that was supposed to occur at cycle N+1.

Figure 7:
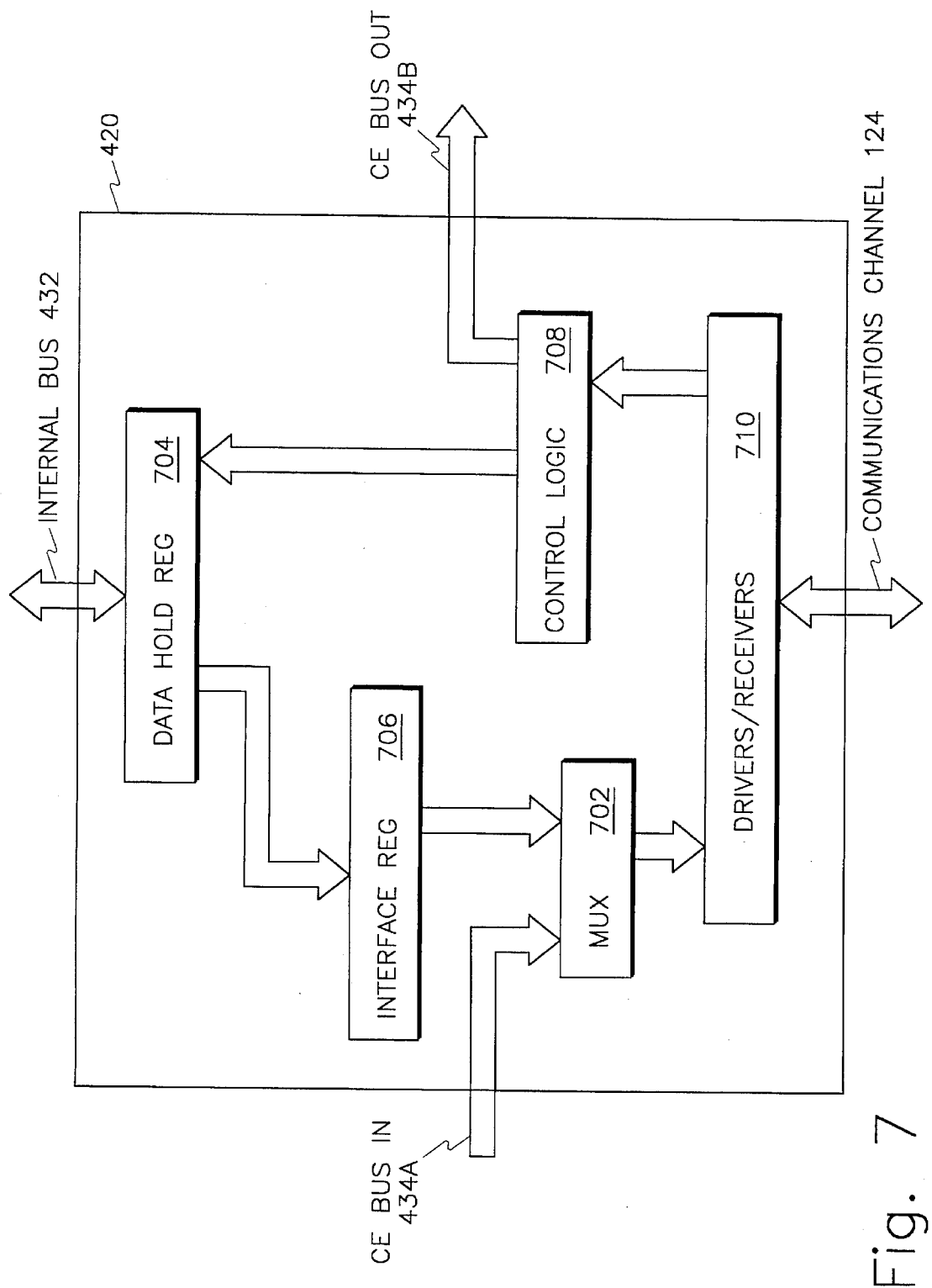
FIG. 7 is a block diagram illustrating a communications interface controller according to the present invention.

The primary control functions of the transparent cycle steal mechanism are implemented in communications interface controller 420. FIG. 7 is a block diagram illustrating communications interface controller 420. Referring to FIG. 7, communications interface controller 420 will now be described. A multiplexer 702 is used to select whether data to be transferred to LAN controller 106 is sourced from CE bus 434 or from interface register 706. Multiplexer 702 also selects the address and read/write signals from these two sources. If data to be transferred is supplemental data the data and address source is CE bus 434. If data to be transferred is data from data buffers 204, the source is internal bus 432.

Two sets of registers are provided for latching data from internal bus 432. A data hold register 704 is used as a prefetch register to store prefetched data and addresses from internal bus 432. Data hold register 704 is used because internal bus 432 is a multiplexed bus and the data to be written to interface controller 106 is not always available. Therefore, data hold register 704 prefetches and stores the data when it is available. In this manner, the data is available to communications interface controller 420 when it is required. Data hold register 704 also holds data to be transmitted over internal bus 432. An interface register 706 retrieves the data from data hold register 704 so it is available at multiplexer 704.

Control logic 708 is provided to perform logic functions such as parity checks and one byte or half word degating. Control logic 708 also determines whether data read from LAN controller 106 is supplemental data destined for CE bus 434 or data for internal bus 432. In this respect, control logic 708 performs a similar function for supplemental data reads that multiplexer 702 performs for supplemental data writes.

Drivers and receivers 710 are provided to interface to communications channel 124. Drivers and receivers 710 provide the correct signal levels for transmission over communications channel 124.

Communications channel 124 could be implemented using any of a variety of communications/protocol standards. The protocol of the preferred embodiment ("preferred protocol") supports three modes of data transfer operations: basic, burst and byte. In a preferred embodiment, communications adapter 104 accesses LAN controller 106 in all three modes.

The preferred protocol interface signals are described in detail in Table 1. These signals describe communications channel 124 as implemented in a preferred embodiment. It will be apparent to a person skilled in the relevant art how communications channel 124 can be implemented using alternative protocols.

TABLE 1

Communications Adapter Interface Signals
The communications adapter 104 - LAN controller 106
interface is as follows:

| | |
|---|---|
| Address 0–19, +X | Negative active address bus (20 bits) with positive extension bit. Inputs to LAN controller 106. The communications adapter 104 provides the 16 low order address bits to LAN controller 106. |
| Data Hi 0–7, P0 | Negative active high-order data |

TABLE 1-continued

Communications Adapter Interface Signals
The communications adapter 104 - LAN controller 106
interface is as follows:

| | |
|---|---|
| | byte with parity. Bi-directional between LAN controller 106 and communications adapter 104. |
| Data Lo 0–7, P1 | Negative active low-order data byte with parity. Bi-directional between communications adapter 104 and LAN controller 106. |
| DATA PARITY ENABLE | LAN controller 106 checks data parity on writes to LAN controller 106 when this signal is tied to ground. |
| ERR | Negative active error signal. Output from LAN controller 106. Indicates an error was detected by LAN controller 106. |
| HW | Negative active halfword bus transfer signal. Input to LAN controller 106. |
| IRPT | Negative active interrupt signal. Output from LAN controller 106. |
| USEL | Negative active MMIO (memory mapped I/O) select signal. Input to LAN controller 106. |
| Reset | Negative active system reset signal. Input to LAN controller 106. |
| WRTL | Negative active write signal. Input to LAN controller 106. |
| XFERACK | Negative active transfer acknowledge signal. Output from LAN controller 106. |

Table 2 illustrates the signals used on CE bus 434 in a preferred embodiment. These signals are chosen to maximize utility in conjunction with the preferred protocol used in communications channel 124. It will be apparent how a person skilled in the relevant art could use alternative signal implementations to achieve the goals of transferring supplemental data across CE bus 434 for transfer to/from LAN controller 106. Instead of MSEL as used in the preferred protocol, CE bus 434 uses a command executor start (CESTART) signal. CESTART indicates that HPPB slave interface 412 is requesting a command executor 422 transfer operation.

CE bus signals include a command executor acknowledge signal (CEACK) that indicates to HPPB slave interface 412 that the requested transfer is completed. There are data input (CEDATAIN) and data output (CEDATOUT) signals for input and output data and their associated parity signals, CEINPTY and CEOUTPTY, respectively. Address signals (CEADDOUT) provide the address of the space in LAN controller 106 to be used in the transfer.

CE bus 434 uses three error signals to indicate three different types of errors. Command Executor Parity Check Error (CEPCERR) indicates whether the data received from LAN controller 106 has a parity error. The LAN controller error tag (CESPYERR) indicates that communications adapter 104 received an error tag from LAN controller 106. The command executor error tag (CETOERR) indicates that LAN controller 106 failed to respond to communications adapter 104.

TABLE 2

CE Bus 434
The dedicated internal CE bus 434 between Command
Executor and the HPPB Slave Controller 412 comprises
the following signals:

| | |
|---|---|
| CEACK | Command Executor Acknowledge signal. Indicates to the Slave HPPB bus interface 412 that the requested CE transfer operation has completed. In a "READ" operation, CEACK also indicates the validity of the data on CE bus 434. |
| CEADDOUT (0–15) | Command Executor LAN controller 106 Address. These signals contain the address of the space in LAN controller 106 that is going to be used in the CE transfer. |
| CEDATAIN (0–15) | Command Executor Data in. These signals contain the data that has been "transferred in" from space in LAN controller 106 by a read operation. These signals are outputs of command executor 424 and inputs to the slave interface 412. |
| CEDATOUT (0–15) | Command Executor Data out. These signals contain data to be transferred to space in LAN controller 106 in a write operation. These signals are outputs of slave interface 412 and inputs to the command executor 424. |
| CEEWD | Command Executor Halfword. Indicates. if the transfer operation consists of a Byte of data ("0") or a Halfword of data ("1"). |
| CEINPTY (0–1) | Command Executor Input data Parity. Contains the data parity for the CEDATAIN signals. |
| CEOUTPTY (0–1) | Command Executor Output data Parity. Contains the data parity for the CEDATAIN signals. |
| CEPCERR | Command Executor Parity check Error. Indicate when there is a data parity error during a command executor 424 read operation. |
| CERDWT | Command Executor Read Write Indicator. Indicates if the transfer operation is a READ ("0") or a WRITE ("1"). |
| CESPYERR | Command Executor Parity Error Indicates that LAN controller 106 Error Tag was asserted during a Command Executor transfer. |
| CESTART | Command Executor Start. This signal indicates to communications interface controller 420 that the slave interface 412 is requesting a Command-Executor Transfer operation. |
| CETOERR | Command Executor Time Out Error. The Time Out error mechanism monitors the XFERACK signal. It indicates a failure of LAN controller 106 to respond with the activation or ideactivation of XFERACK. |

Table 3 lists and describes the signals used on internal bus 432 in a preferred embodiment. On internal bus 432, each user has a dedicated address. When a user wants to access internal bus 432 it activates a data mover bid signal (DMBID). When a user is granted access to the bus it is given a data mover select signal (DMSEL) indicating that it has the bus on the following cycle. On the following cycle, that user will either read data from or write data to internal bus 432 depending on the polarity of a data mover read/write signal (DMRDWT).

Alternative embodiments may be implemented wherein other signals and/or signal levels are utilized to accomplished the required functionality of internal bus 432 utilization.

TABLE 3

Internal Bus
Internal Bus 432 is composed of the following signals:

| | |
|---|---|
| DMADDRIN (0–14) | Data Mover Internal Address Space. Contains the memory space address in communications adapter 104 to be used for the transfer operation. |
| DMDATA (0–15) | Contains the data to be placed in the memory space in communications adapter 104 during a "READ" operation. These signals are loutputs from the data mover 422. |
| DMPRTY (0–1) | Contains the parity bits for the DMDATA signals. These signals are outputs from data mover 422. |
| DATAIN (0–15) | Contains the data to be placed in the memory space in LAN controller 106 during a "WRITE" operation. These signals are inputs to data mover 422. |
| DATAPRTY (0–1) | Contains the parity bits for the DATAIN signals. These signals are outputs from data mover 422. |
| DMBID | Data mover Bid signal. This signal is the Data Mover request to use the internal bus to access memory space in communications adapter 104. |
| DMRDWT | Data Mover Read/Write signal to the internal bus. A "0" indicates "READ" and a "1" indicates "WRITE". |
| BTJSRDWT | Internal Bus Read/Write signal to the internal memory indicating whether the current internal bus cycle is a READ or a WRITE cycle. A "0" indicates "READ" and a fill indicates "WRITE". |
| DXSEL | Data Mover Select. The activation of this signal is the response of the Internal Bus arbitration function to the DMBID signal. When active, it indicates that the Data Mover can access the internal bus in the next cycle. |
| ERRHALT | Error Halt. A communications adapter 104 internal error has been detected. Due to this error data mover 422 is requested to stop any transfer operation. |
| DWACTIVE | Data Mover Active. The data mover 422 is considered to be active from the time the "Start Data Move" bit in reg 34 is set. This signal gets reset at the same time the data mover 422 finite state machines arrive to their idle state. This happens after the operation is completed or an error occurred. |
| DMERRDET | Data Mover Error Detect. Indicates that data mover 422 has detected an error. The detected errors included in this signal are Data Parity error, Time Out error and PG Error Tag. |

3. Timing Diagrams

Figure 8:
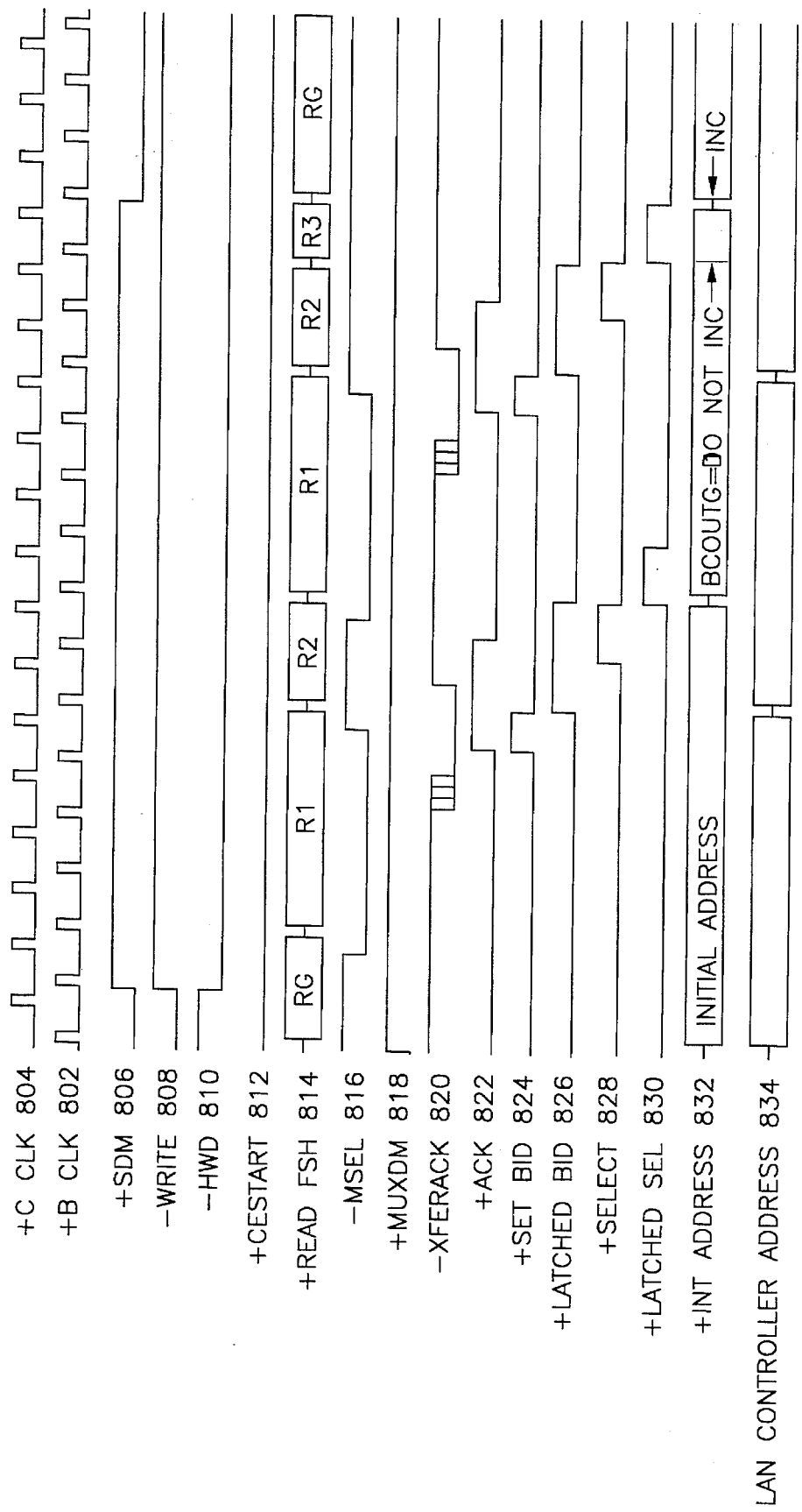
FIG. 8 is a timing diagram illustrating signal states for a data mover read operation.

The transfer operations of communications adapter 104 can be described using timing diagrams to illustrate the signals associated with such transfers. FIG. 8 is a timing diagram illustrating a read operation of communications adapter 104. More specifically, FIG. 8 illustrates signals associated with a read operation of data mover 422. A B-clock signal (B Clk) 802 launches data onto internal bus 432. This data is latched using a C-clock signal (C Clk) 804.

The cycle is measured from one rising edge of B Clk 802 to the next rising edge of B Clk 802.

A start data mover signal (SDM) 806 tells data mover 422 to start transferring data. SDM 806 is set by picoprocessor 202. SDM 806 is not set positive until all of the address pointers and read/write signals have been set to the correct state. Write signal 808 is an active low signal that goes high for a read operation. Because FIG. 8 illustrates a read operation, Write signal 808 is illustrated high. During write operations, write signal 808 is at a low level. HWD 810 is the active half-word bus transfer signal. When HWD 810 is not positive, this indicates a half-word transfer as opposed to a full-word transfer. Write signal 808 and HWD 810 are set by picoprocessor 202.

CESTART 812 is a signal from command executor 422 indicating that supplemental data is to be transferred. CESTART 812 is positive when command executor 422 has supplemental data to be transferred. If CESTART 812 goes positive when data is being transferred by data mover 422, this indicates that supplemental data is to be interleaved with data currently being transferred.

Read FSM 814 indicates which of four states the finite state machine is in. It is in state R1 that the finite state machine in data mover 422 transfers data to LAN controller 106.

MSEL 816 goes low to indicate that a memory mapped I/O transfer has been selected. This signal, on communications channel 124, indicates that a transfer between LAN controller 106 and communications adapter 104 is to take place. In general, MSEL 816 is a synchronization signal between communications adapter 104 and LAN controller 106. communications adapter 104 activates MSEL 816 to indicate to LAN controller 106 that everything is ready for a data transfer operation.

MUXDM 818 controls multiplexer 702. A positive MUXDM 818 signal controls multiplexer 702 to select data from data mover 422.

Transfer acknowledge signal XFERACK 820 transitions to negative to indicate that LAN controller 106 has received the transferred data. This is an acknowledge signal from LAN controller 106 over communications channel 124. ACK 822 is a latched version of XFERACK 820. ACK 822 is the opposite polarity of XFERACK 820.

Once LAN controller 106 has received or supplied the data for the transfer, it responds by activating XFERACK 820 which is latched to form ACK 822. When communications adapter 104 receives XFERACK 820, the operation is completed and MSEL 816 is deactivated. When LAN controller 104 sees that MSEL 816 is not active, it deactivates XFERACK 820. This "hand shaking" is repeated for every half word (two bytes) of data that are transferred.

Set bid signal 824 is the signal used by data mover 422 to request access to communications channel 124. Set bid signal 824 is latched to form latched bid signal 826.

When data mover 422 is granted access to the bus, select signal 828 is positive. Select signal 828 is latched to form latched select signal 830. A positive select signal 828 indicates to data mover 422 that it has the bus on the following cycle.

Also illustrated in FIG. 8 are internal address signal 832 and LAN controller address signal 834. Internal address 832 is the address for data buffers 204.

Figure 9:
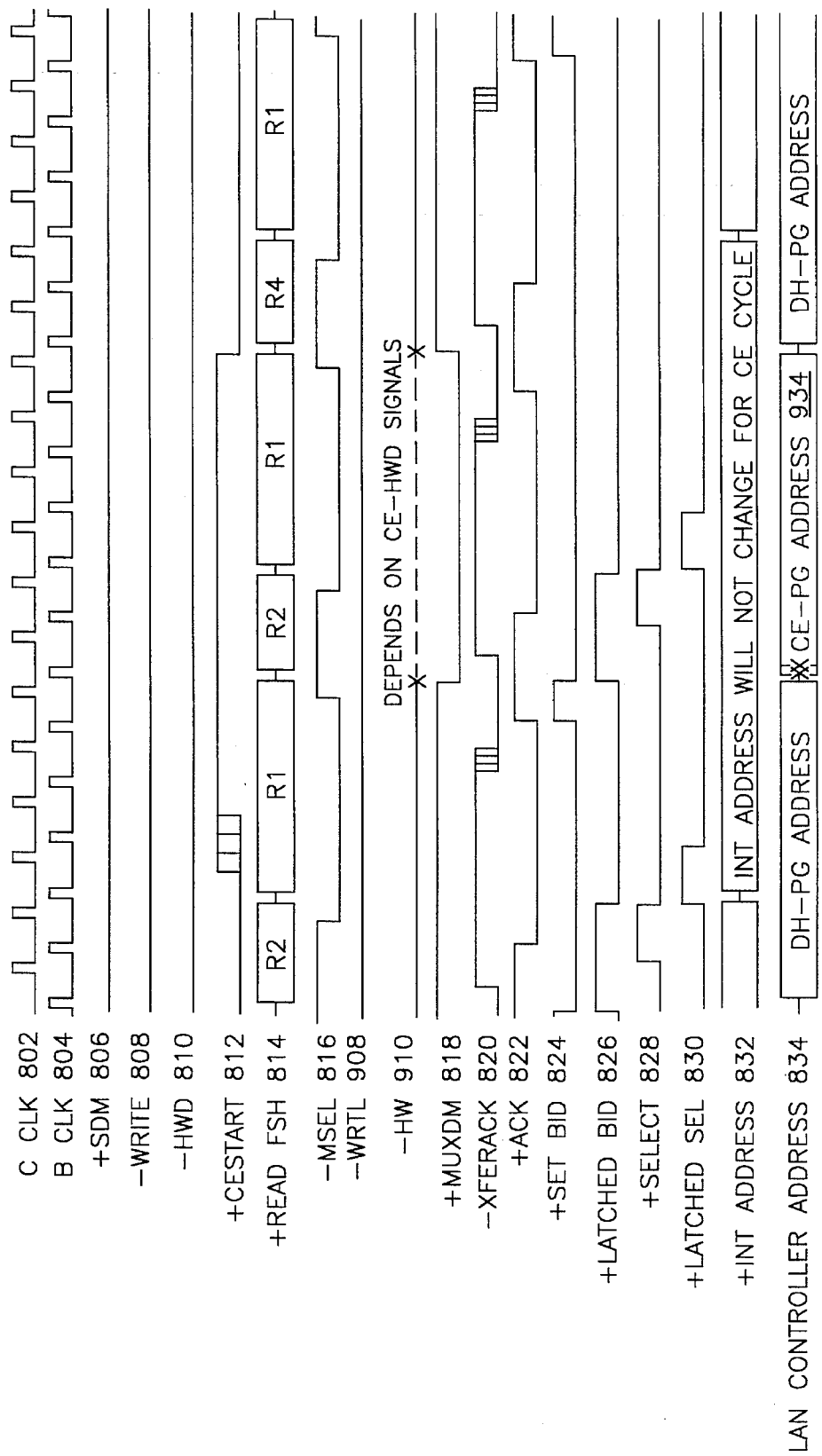
FIG. 9 is a timing diagram illustrating signal states for interleaving a command executor read operation with a data mover read operation.

FIG. 9 is a timing diagram illustrating a command executor read cycle interleaved within a data mover read operation. The signals illustrated in FIG. 9 are essentially the same as those in FIG. 8. Some additional signals are illustrated for the command executor read cycle. Start data mover 806 is activated indicating that a data mover transfer is in process. Write signal 808 is activated indicating that the data mover transfer is a read operation versus a write operation. Also, HWD 810 is active indicating a half word transfer.

CESTART signal 812 goes active when command executor 422 wishes to interrupt the data mover cycle and interleave supplemental data. This is illustrated by the positive transition of CESTART signal 812 in FIG. 9.

The activation of CESTART after a data mover transfer operation is in progress causes the data mover to try to interleave the command executor cycle within the memory mapped I/O transfer operation.

In a preferred embodiment, for a basic data mover read operation, the CE cycle will be interleaved within the data mover transfer. If the amount of remaining data bytes to transfer is 4 or more, if there is no error, and if there is no request to abort the operation, then the read finite state machine checks for an active CESTART 812 signal during the R1 state. If, at this time, CESTART 812 is active and ACK 822 has been set, multiplexer 702 is switched to accept data from command executor 422. This is indicated by MUXDM signal 818 in the negative state. This action changes the LAN controller 104 address 834 and data signals to contain the information provided by command executor 422. As illustrated in FIG. 9, HW signal 910 may change depending on whether the CE transfer is a half-word transfer. Write signal 908 does not go low because the CE operation interleaved is a read cycle.

FIG. 9 also illustrates LAN control address 834 and the portion of that address 934 that contains the address for a command executor read cycle. Note, there is no bid for internal bus 432 while the command executor cycle is being serviced as this cycle uses dedicated CE bus 434. Also note that internal address 832 will not be incremented during the cycle in which the command executor cycle occurs.

LAN controller address 834 is incremented when the finite state machine transitions out of state R1. Also at this time, multiplexer 702 is switched back to servicing data mover 422 as illustrated by the positive transition of MUXDM signal 818 in FIG. 9. If multiplexer 802 switches at a rate slower than the time it takes for the counters containing LAN controller address 834 to increment, LAN controller address signals 834 will show a double change. This, however, has no adverse impact because LAN controller address signal 834 has sufficient time to stabilize before MSEL 816 is activated (negative) and LAN controller 106 uses the address.

Figure 10:
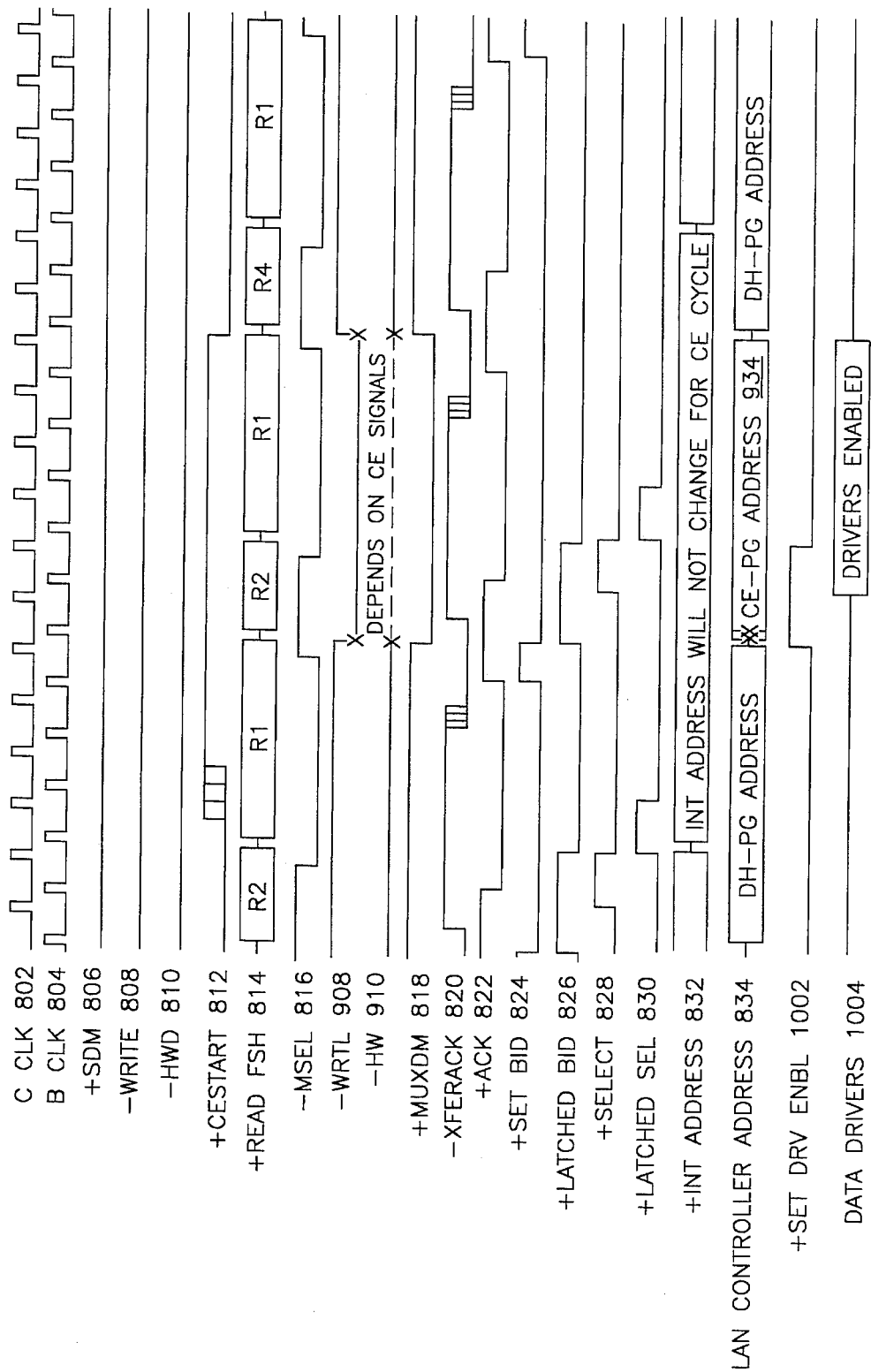
FIG. 10 is a timing diagram illustrating signal states for interleaving a command executor write operation with a data mover read operation.

FIG. 10 is a timing diagram illustrating a command executor write signal interleaved within a data mover read operation. When the command executor cycle to be serviced is a write operation and the data mover operation is a read operation, drivers/receivers 710 must be "turned around" because they are currently in the receiver mode. Thus, FIG. 10 illustrates set driver enable signal 1002 and the latched version of this signal, data driver signal 1004. When set driver enable signal 1002 is positive and this signal is latched, the data drivers will be enabled for a write operation. These are data drivers of communications adapter 104. These drivers must be switched off rapidly once the transfer is complete and WRTL 908 has changed, in order to avoid collisions with LAN controller 106 drivers. To accomplish this, data drivers signal 1004 is gated by write signal 908. As soon as write signal 908 changes, the drivers are disabled.

Because this is a write operation, Write signal 908 goes active during the time that command executor 422 is granted access to communications channel 124. This is not the case for the read operation described with reference to FIG. 9.

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A communications adapter for coupling a first device, coupled to said communications adapter by a communications channel, to a second device, coupled to said communications adapter by a data bus, for interleaving second data with first data already being transferred between the first device and the second device, wherein the communications channel and the data bus may operate at different speeds, comprising:

first means for transferring the first data between the first and second devices;

second means for receiving the second data from one of the first and second devices, wherein the received second data is to be transferred to the other one of the first and second devices; and third means, coupled to said first and second means, for interleaving the received second data with the first data already being transferred;

wherein the second data is transferred without having to arbitrate for ownership of the communications channel or data bus over which said data transfer between the first and second device is occurring.

2. The communications adapter of claim 1, wherein said third means comprises:

inhibiting means for inhibiting said first means from transferring the first data for at least one transfer cycle; and transferring means for transferring the second data between the first and second devices during said at least one transfer cycle that said first means is inhibited from transferring the first data.

3. The communications adapter of claim 1, wherein said second means comprises:

determining means for determining whether said first means is currently transferring the first data between the first and second devices; and second transferring means for transferring the second data between the first and second devices if said first means is not currently transferring the first data between the first and second devices.

4. The communications adapter of claim 1, wherein said first means comprises:

first interface means for interfacing said communications adapter with the first device via the communications channel;

second interface means for interfacing said communications adapter with the second device via the data bus;

controlling means for controlling the transfer of first data between said first and second interface means; and a first bus, connecting said first interface means, said second interface means, and said controlling means, wherein the first data is transferred via the first bus between first interface means and second interface means.

5. The communications adapter of claim 4, wherein said controlling means comprises:

buffer means for temporarily storing the first data being transferred; and processor means for controlling storage and retrieval of the first data in said buffer means and for controlling the transfer of the first data via said first bus between said first interface means, said buffer means, and said second interface means.

6. A communications adapter of claim 4, wherein said second means comprises a second bus, coupled to said first and second interface means, wherein the second data is transferred via said second bus between said first and second interface means.

7. A communications adapter of claim 6, wherein said first interface means comprises:

disconnecting means, coupled to said first bus, for disconnecting said first bus from said first interface means during said at least one transfer cycle that said first means is inhibited; and connecting means, coupled to said second bus, for connecting said second bus to said first interface means during said at least one transfer cycle that said first means is inhibited;

wherein said second means transfers the second data during said at least one transfer cycle that said first means is inhibited.

8. A communications adapter of claim 4, wherein said second interface means comprises at least one of a master interface and a slave interface.

9. A communications adapter for coupling a first device, coupled to said communications adapter by a communications channel, to a second device, coupled to said communications adapter by a data bus, for transferring second data between the first device and the second device along with first data already being transferred between the first and second devices, wherein the transfer of the second data occurs without having to arbitrate for ownership of the communications channel or data bus, comprising:

a communications interface controller for controlling the transfer of first and second data between the first device and said communications adapter over the communications channel;

a data bus interface for controlling the transfer of first and second data between the second device and said communications adapter over the data bus;

a first bus for transferring the first data between said communications interface controller and said data bus interface;

a second bus for transferring the second data between said communications interface controller and said data bus interface; and controlling means for controlling the transfer of the first data between said communications interface controller and said data base interface of said communications adapter.

10. The communications adapter of claim 9, wherein said controlling means comprises:

buffer means for storing the first data being transferred between the first and second devices;

processor means, coupled to said buffer means, for controlling the transfer of the first data via said first bus between said communications interface controller, said buffer means, and said data bus interface.

11. A communications adapter of claim 9, wherein said communications interface controller comprises:

a communications interface coupled to the communications channel for interfacing with the first device;

a data mover, coupled to said communications interface and said first bus for transferring first data between said data bus interface and said communications interface; and a command executor, coupled to said communications interface, said data mover, and said second bus for transferring second data to said data bus interface and said communications interface.

12. The communications adapter of claim 11, wherein said communications interface controller is further configured to:

inhibit the transfer of the first data by said data mover for at least one transfer cycle;

disconnect said first bus from the communications interface;

connect said second bus to the communications interface; and cause said command executor to transfer the second data.

13. The communications adapter of claim 11, wherein said command executor is further configured to:

determine whether said data mover is currently transferring the first data;

connect said second bus to said communications interface if said data mover is not currently transferring the first data; and transfer the second data if said data mover is not currently transferring the first data.

14. A communications adapter of claim 9, wherein said data bus interface comprises:

a master interface, wherein said communications adapter functions as a master and said data bus interface as a master interface when the first device originates first and second data transfers; and a slave interface, wherein said communications adapter functions as a slave and said data bus interface as a slave interface when the second device originates first and second data transfers.

15. A method of interleaving second data with first data being transferred between a first device and a second device over a data bus and a communications channel by a communications interface controller, wherein the data bus and communications channel may operate at different speeds, wherein data is transferred in units, each unit transferred during one transfer cycle, and wherein the transfer of second data occurs without having to arbitrate for ownership of the data bus or the communications channel, comprising the steps of:

(a) receiving the second data to be transferred between the first device and the second device; and (b) interleaving the second data with the first data being transferred by a data mover, wherein said interleaving comprises the steps of inhibiting data mover counters from updating for at least one transfer cycle;

transferring the second data between the first and second devices while said data mover counters are inhibited, and resuming the transfer of the first data between the first and second devices at the point at which said data mover counters were inhibited for said at least one transfer cycle.

16. The method of claim 15, further comprising the steps of:

(c) determining whether said data mover is currently transferring first data between the first and second devices;

(d) completing a current transfer cycle before performing said step (b) if the first data is currently being transferred by the data mover; and (e) transferring the second data between the first and second devices without interleaving if the data mover is not currently transferring the first data between the first and second devices.

17. The method of claim 15, further comprising the steps of:

(f) disconnecting a first bus from said communications interface controller during said at least one transfer cycle that said data mover counters are inhibited, wherein said first bus is used in the transfer of the first data between said first and second devices; and (g) connecting a second bus to the communications interface controller during said at least one transfer cycle that said data mover counters are inhibited, wherein said second bus is used in the transfer of the second data between the first and second devices.

18. The method of claim 15, further comprising the step of rate buffering the first data to compensate for a difference in data transfer rates between the communications channel and data bus.

* * * * *